United States Patent [19]

Ikariya et al.

[11] Patent Number: 5,054,710
[45] Date of Patent: Oct. 8, 1991

[54] SPOOL FOR FILM AND LENS UNITS

[75] Inventors: Toshiyuki Ikariya; Osamu Shibazaki, both of Tokyo, Japan

[73] Assignee: Konica Corporation, Tokyo, Japan

[21] Appl. No.: 516,435

[22] Filed: Apr. 30, 1990

[30] Foreign Application Priority Data

May 15, 1989 [JP] Japan ................................. 1-55929[U]
May 15, 1989 [JP] Japan ................................. 1-55930[U]

[51] Int. Cl.$^5$ ............................................. B65H 75/28
[52] U.S. Cl. ..................................................... 242/74
[58] Field of Search ...................... 242/74, 74.1, 74.2, 242/71.1, 71.2, 71.8, 68.5

[56] References Cited

U.S. PATENT DOCUMENTS

| | | |
|---|---|---|
| 3,383,069 | 5/1968 | Riedel et al. .......................... 242/74 |
| 4,398,679 | 8/1983 | Kluczynski et al. ................... 242/74 |
| 4,445,770 | 5/1984 | Morse .............................. 242/74 X |
| 4,834,310 | 5/1989 | Ikariya et al. ........................ 242/74 |
| 4,955,555 | 9/1990 | Pierson et al. ........................ 242/74 |

Primary Examiner—John M. Jillions
Attorney, Agent, or Firm—Frishauf, Holtz, Goodman & Woodward

[57] ABSTRACT

A spool for winding a photographic roll of film in a camera. The spool includes a shaft having a slit formed by opposed walls one of which has a protrusion extending into the slit and positioned between two ribs of the other wall. The protrusion is received in a perforation of the film tongue to wind the film when the spool is turned in a winding direction. When the film is unwound, the film tongue smoothly and reliably slips out of the slit as the perforation wall slides down an angled wall of the protrusion so that the film is released from the spool.

6 Claims, 4 Drawing Sheets

SPOOL FOR FILM AND LENS UNITS

BACKGROUND OF THE INVENTION

This invention relates to an improved spool for winding a photographic roll film, and particularly to a spool for winding a roll film accommodated in a film unit with a lens (film and lens units).

Recently, film and lens units or so-called disposable cameras are appearing on the market. Namely, the film and lens unit itself is designed to constitute a simple camera by attaching a lens to a cartridge for accommodating a roll film to enable photographing by feeding the film frame by frame.

The film and lens unit usually comprises a cartridge with a lens accommodating a roll film of type 135 in a patrone and a slotted spool disposed outside of the patrone; wherein the tongue of the film extending from the patrone is designed to be inserted into the slit formed on the spool, and the film in the patrone is wound up fully onto the spool with the tail end of the film being firmly retained in the patrone.

Further, when the film is completely used through photographing, the film once wound up on the spool is rewound into the patrone since the film has been fed back frame by frame as the photographing proceeded. In this state, the film unit is sent to a photo-finishing laboratory. At the laboratory, the film and lens unit is disassembled to take out the patrone and then the roll film is subjected to an ordinary developing process for type 135 film.

As shown in FIG. 9 (front view) and FIG. 10 which shows a cross-sectional view taken along line A—A of FIG. 9, the spool (1) has a roll shaft (6) with a slit (7) formed thereon. The slit (7) has holding ribs (9) and (8) respectively at inner walls (7a) and (7b) which are opposed to each other.

At both ends of the roll shaft (6), flanges (5) are respectively provided. Further provided coaxially to the roll shaft (6) are bosses (2) and (3) at both outer sides of the flanges (5), and a drive transmission joint (4) at the end of one boss (3).

When the film is allowed to be wound up on the spool (1) after the tongue of the roll film contained in the patrone is inserted into the slit (7) formed on the roll shaft (6) of said spool (1), it is essential to prevent the film from slippage out of the slit (7) at the initial stage of winding. On the other hand, when the film is completely used, it is essential that said tongue is easily released from the slit (7) of the spool (1) and rewound completely or nearly completely into the patrone.

In particular, if the tongue slips out of the slit (7) at the initial stage of winding, the unit is defective and is not usable as a camera. On the other hand, if the tongue is not released from the slit (7) even after completion of photographing with the film, some portion of the used film adjacent to the tongue remains outside of the patrone, so that said portion of the film is exposed to light and suffers light fog when the used film is taken out from the cartridge by disassembling the film and lens unit. Accordingly, the results of the user's photography are spoiled at the exposed portion.

Consequently, it is essential required for the spool (1) to be designed so that the slit (7) firmly holds the tongue of the roll of film at the initial stage of winding the film, and that slit 7 easily releases the tongue at the end of photographing with the film. Conventional spools cannot perform these tasks reliably and repeatedly.

Moreover, when the tongue is inserted into the slit (7) in the conventional spools, the tongue sometimes extends through the slit to protrude from the opposite opening of the slit (7), as shown in FIG. 11. If the film is wound up in such state, the protruding portion of the tongue causes the wound film roll to be distorted. Therefore, so-called pressure fog is liable to be caused at the distorted portions.

SUMMARY OF THE INVENTION

An object of this invention is to provide a spool for a film and lens unit, which can overcome the above problems.

The above object can be attained by a spool for a film and lens unit, which has a slit (7) formed on the roll shaft (6) into which the tongue (23) of a roll film extending from a patrone can be inserted; a protrusion (13), which catches the first perforation (21) formed in the film tongue (23), provided on one inner wall (7a) of the slit (7); film holding ribs (11) and (12) provided on the opposite inner wall (7b) of the slit (7) along the axis of the roll shaft (6) in such a way that the protrusion (13) may locate between these holding ribs (11) and (12) as viewed from the radial direction; and a protrusion (14), which catches the second perforation (22) formed in the film tongue (23), provided adjacent to the edge of the slit (7) on the side in the direction of rewinding the film into the patrone; wherein the end or the opposite opening of the slit (7) is preferably closed partly or entirely to form an inner wall (7e) against which the tip of the film tongue (23) is abutted to prevent its protrusion therefrom and facilitate catching of the first perforation (21) by the protrusion (13).

DESCRIPTION OF THE PREFERRED EMBODIMENTS

This invention will now be described by way of preferred embodiments.

Figure 9:
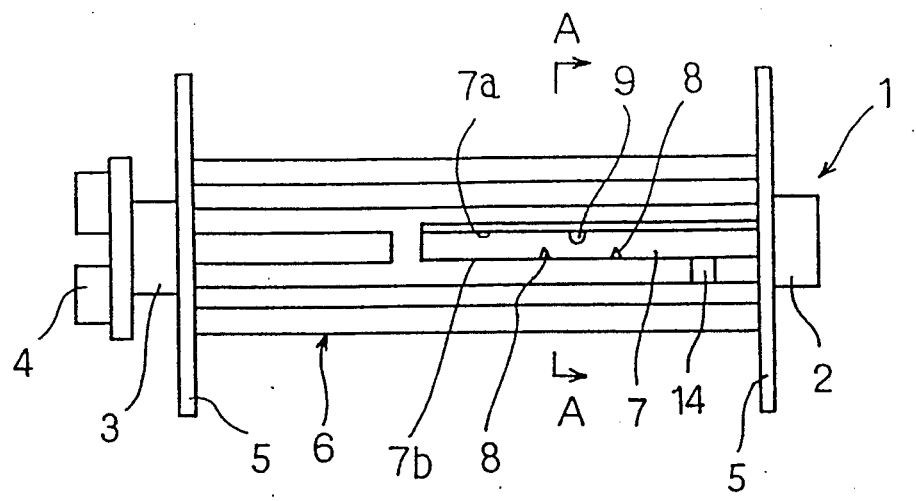
FIG. 9 shows a front view of a conventional spool.
Figure 10:
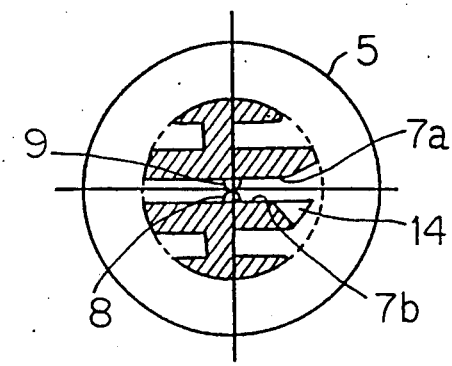
FIG. 10 shows a cross-sectional view taken along line A—A of FIG. 9.
Figure 11:
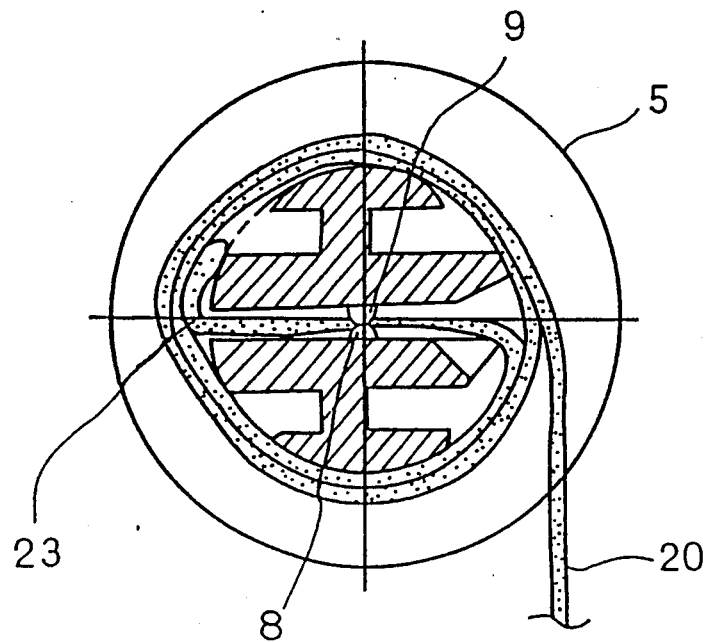
FIG. 11 is a cross-sectional view illustrating a state where a film is wound up on the conventional spool.

However, it should be understood that this invention is not limited to them. In the drawings, parts which have similar functions to those in the conventional spool (refer to FIG. 9 to 11) are shown with the same reference numerals respectively.

The slit (7) of the spool (10) according to this invention comprises a pair of longitudinal inner walls (7a) and (7b) which are parallel to each other and another pair of inner walls (7c) and (7d) which are right-angled to the inner walls (7a) and (7b) and orthogonal to the axis of a roll shaft (6), with the axis of the roll shaft (6) being included in the space defined by these inner walls (7a) through (7d). A protrusion (13) for catching the first perforation (21) of a film (20) is provided on the inner wall (7a), and film holding ribs (11) and (12) are provided on another inner wall (7b) spaced from protrusion (13) in the direction of the axis of the roll shaft (6) so that the protrusion (13) is located therebetween. Further, a protrusion (14) for catching the second perforation (22) of the film (20) is provided adjacent to the edge of said inner wall (7b) in the direction of rewinding the film. The length of the inner walls (7c) and (7d) is designed to be substantially equal to the width of the tongue (23) of the film (20).

Figure 7:
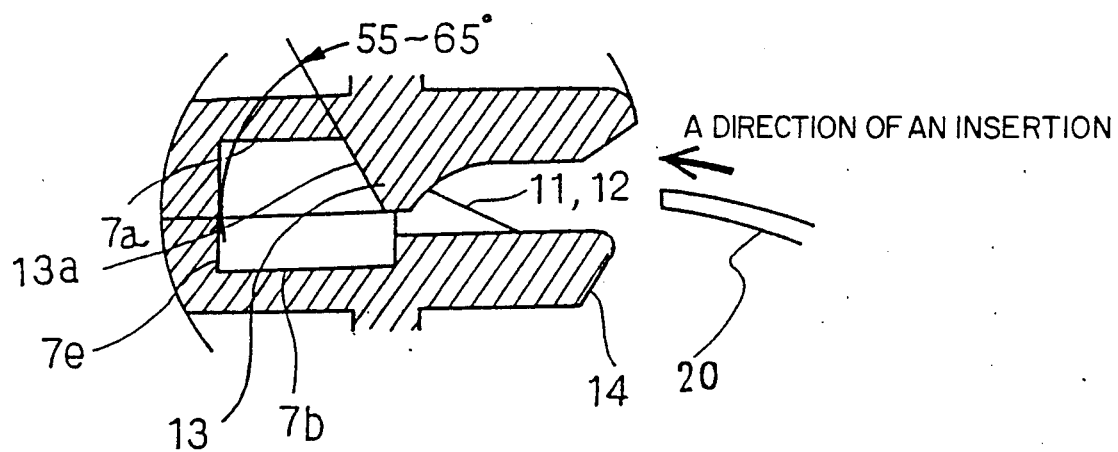
FIG. 7 is a cross-sectional view corresponding to FIG. 5, illustrating a spool of a second embodiment according to this invention.
Figure 8:
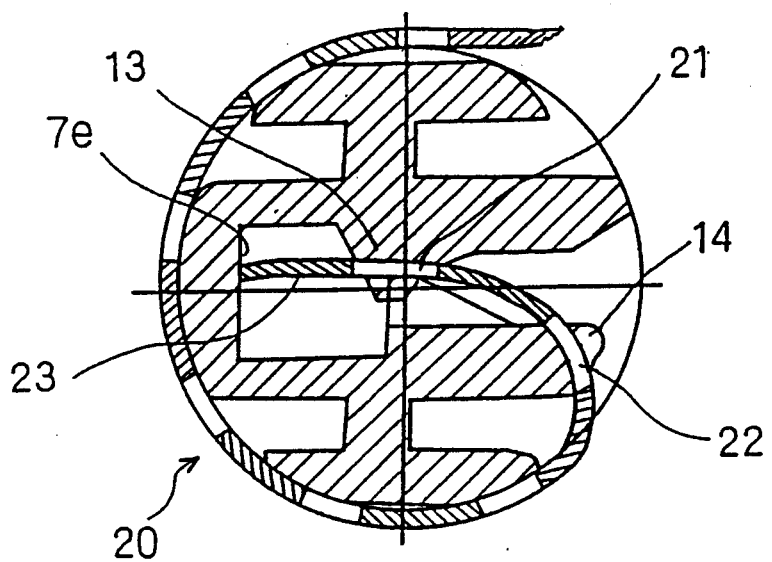
FIG. 8 is a cross-sectional view illustrating a state where a film is wound up on the spool of the second embodiment according to this invention.

Incidentally, is inner wall (7e) may be provided in a second embodiment shown by FIGS. 7 and 8 so that perforations (21) and (22) are just caught by the protrusions (13) and (14) respectively with the tip of the tongue (23) being abutted against the wall (7e) (see FIG. 7), whereby catching of the first and second perforations (21) and (22), respectively, by the protrusions (13) and (14) can be facilitated (see FIG. 8). However, the manner of facilitating such catching is not limited to such inner wall (7e).

Figure 5:
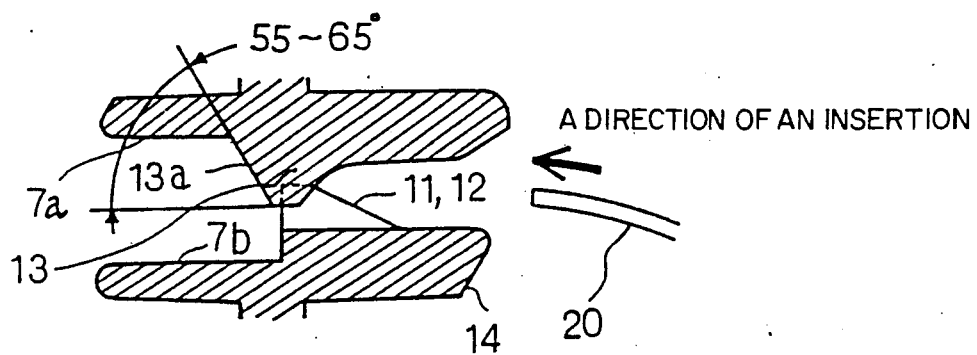
FIG. 5 shows a cross-sectional view taken along line C—C of FIG. 2.

It should be noted that the catching face (13a) of the protrusion (13) on which the first perforation (21) is engaged is designed to have a slope angle of 55° to 65° relative to said inner wall (7b) (see FIG. 5 and 7).

Figure 1:
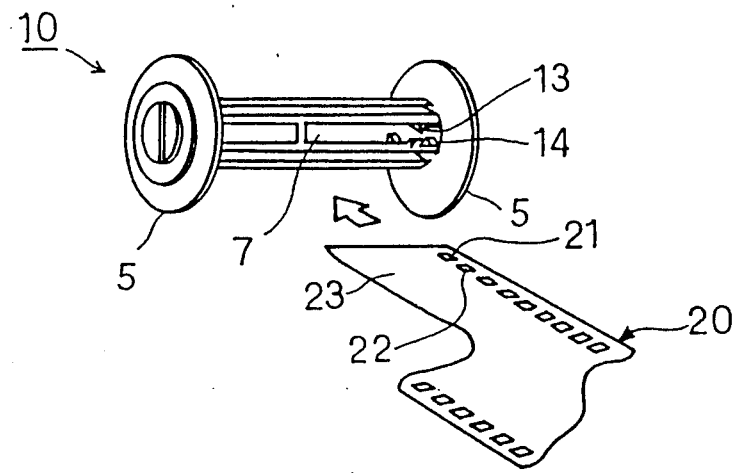
FIG. 1 is a perspective view illustrating a spool of a first embodiment according to this invention.
Figure 2:
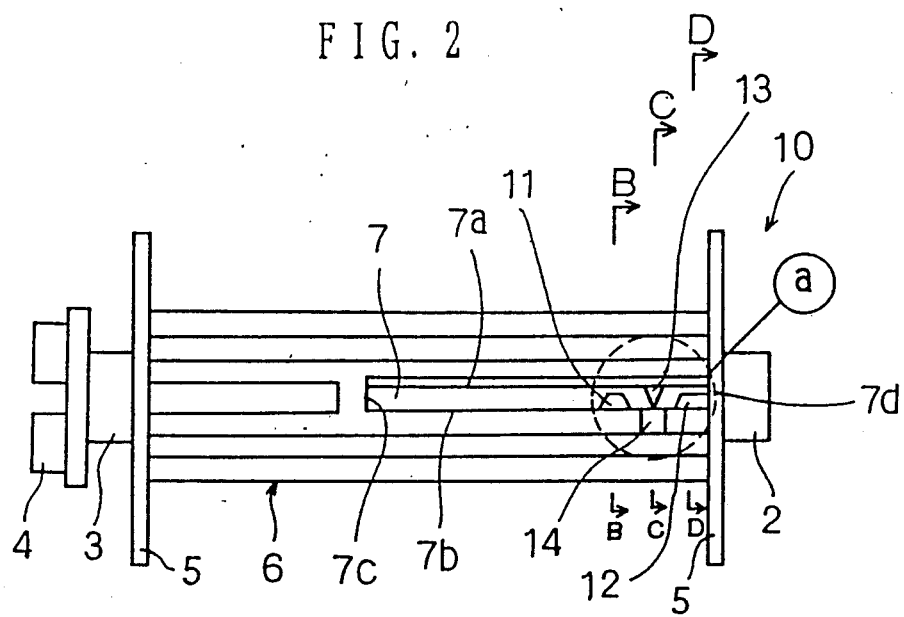
FIG. 2 is a front view illustrating the spool of the first embodiment according to this invention.
Figure 3:
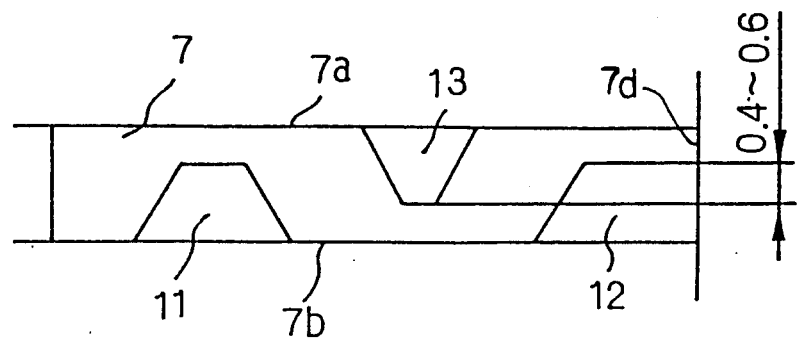
FIG. 3 shows an enlarged view of the section marked with "a" in FIG. 2.
Figure 4:
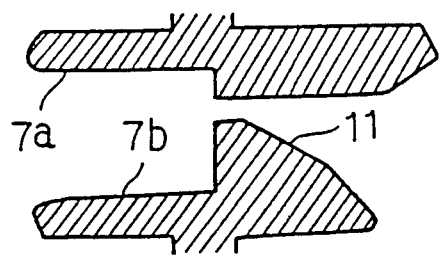
FIG. 4 shows a cross-sectional view taken along line B—B or D—D of FIG. 2.

On the other hand, said protrusion (13) is designed to have a height relative to said holding ribs (11) and (12), so that the former and the latter may have an overlapping height of 0.4-0.6 mm on a plane orthogonal to the axis of the roll shaft (6) and to the inner walls (7a) and (7b) (see FIG. 3). Additionally, a pair of flanges (5), bosses (2) and (3), and a drive transmission joint (4) are coaxially provided at the ends of the roll shaft (6).

Figure 6:
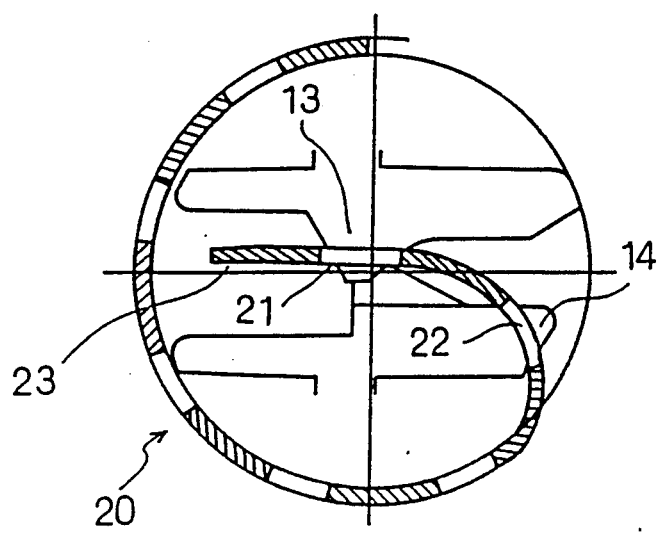
FIG. 6 is a cross-sectional view illustrating a state where a film is wound up on the spool of the first embodiment according to this invention.

When the tongue (23) of the film is inserted into the slit (7) of the spool (10) to start winding of the film on the spool (10), the catching face (13a) first engages with the first perforation (21), and the tongue (23) is stably held by the action of the protrusion (13) in cooperation with the holding ribs (11) and (12). Then, the second perforation (22) in the tongue (23) is caught by the protrusion (14) to yield an increased holding force as the film winding proceeds. (see FIG. 6).

Incidentally, in the embodiment shown in FIGS 7 and 8 where an additional inner wall (7e) is provided, the tip of the tongue (23) is blocked from protruding from the opposite circumferential portion of the roll shaft (6) in the spool (10), whereby pressure fog which may otherwise be caused under the distorted winding condition can be successfully prevented.

Finally, the film originally contained in the patrone is entirely wound up on the spool (10) having such construction as mentioned above. In this state, the tail end of the film is of course firmly retained in a spool disposed in the patrone. Under the above arrangement, the spool (10), the patrone and the film are accommodated in a cartridge for film and lens unit for shipment.

A predetermined number of photographs are taken by a user using the film and lens unit as the film (20) is fed back to or rewound into the patrone, frame by frame. The tongue (23) of the film (20) is held by the projections (13) and (14) and the holding ribs (11) and (12) in the slit (7) of the spool (10) until it is finally released for motion toward the patrone as the second perforation (22) comes off the projection (14) with no resistance and the first perforation (21) smoothly comes off the projection (13) sliding on the catching face (13a).

As described above, in the film winding process for manufacturing film and lens units, properly wound scrolls can be formed. In addition, holding of the tongue (23) onto the spool (10) is secured during the initial stage of film winding, so that film and lens units which function with high accuracy and reliability can be produced. On the other hand, on the part of users, photographing procedures can be carried out smoothly, and the film tongue is securely released from the spool (10) and taken up completely into the patrone after taking a predetermined number of photographs. Accordingly, the serious accidental light fogging of used films which frequently happened during the disassembling of a conventional film and lens unit to take out the patrone in the photofinishing laboratory can be prevented.

As can be seen clearly from the above description, by using the spool according to this invention, high reliability in the film winding for manufacturing film and lens units can be assured and the so-called pressure fog can be prevented, since the films can be wound properly up on the spool, so that the formation of defective articles due to the improper scroll making can be obviated. Moreover, the accidental light fogging of used films during the disassembling of the unit to take out the patrone can be prevented.

What is claimed is:

1. A spool on which photographing film is wound when the spool is turned in a winding rotation, said film having a tongue insertable into a slot of said spool in an inserting direction generally parallel to elongation of said film and attachable to said spool, by which tongue the film is pulled as the spool is turned in said winding rotation, said tongue including at least first and second perforations with said second perforation being further from a leading edge of said tongue in said inserting direction than said first perforation, said spool comprising:

a shaft having two opposed walls defining a slit adapted to extend transversely of said inserting direction, said slit having an entry portion through which said tongue is received;

one of said two opposed walls of the slit having a first protrusion extending into said slit and adapted to fit into said first perforation as said tongue is advanced into said slit;

the other of said two opposed walls having two ribs extending therefrom into said slit with said first protrusion being aligned therebetween in an axial direction of said shaft, said ribs being adapted to engage said film as it is advanced into the slit to thereby position said first protrusion into said first perforation, said other wall at the slit entry portion thereof having a second protrusion spaced from said first protrusion and oriented so as to fit into said second perforation as the spool is turned in said winding rotation following insertion of the film tongue into the slit so as to place the first protrusion into said first perforation, said second protrusion having a clearance area between itself and said one wall; and wherein said first protrusion is tapered such that it includes a wall adapted to engage a leading edge in the inserting direction of said first perforation, with said wall being angled toward said slit entry, whereby the angle of said wall enables the leading edge of the said first perforation to slide off the first protrusion when the tongue is in the clearance area and in response to a force moving said film in a direction opposite to said inserting direction.

2. The spool according to claim 1, wherein an end of the slit opposite to said entry portion is at least partly closed to form an inner wall against which the leading edge of the film tongue is abutted.

3. The spool according to claim 2, wherein said angled wall of the first protrusion engaged with the leading edge of said first perforation has a slope angle of 55° to 65° relative to said inner wall and said first protrusion has a height relative to said ribs so as to have an overlapping height of 0.4 to 0.6 mm on a plane orthogonal to the axis of said shaft and to said opposed walls.

4. The spool according to claim 2, wherein a first spacing between said one wall and said other wall in a front part of said slit to said inserting direction is wider than a second spacing between said one wall and said other wall in a rear part of said slit.

5. The spool according to claim 1, wherein said angled wall of the first protrusion engaged with the leading edge of said first perforation has a slope angle of 55° to 65° relative to said inner wall and said first protrusion has a height relative to said ribs so as to have an overlapping height of 0.4 to 0.6 mm on a plane orthogonal to the axis of said shaft and to said opposed wall.

6. The spool according to claim 1, wherein a first spacing between said one wall and said other wall in a front part of said slit to said inserting direction is wider than a second spacing between said one wall and said other wall in a rear part of said slit.

* * * * *